(12) United States Patent
Reckner (10) Patent No.: US 10,959,560 B2
(45) Date of Patent: Mar. 30, 2021

(54) STEAM COOKING SYSTEM AND METHOD

(71) Applicant: ILLINOIS TOOL WORKS INC., Glenview, IL (US)

(72) Inventor: Michael B. Reckner, Dayton, OH (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 788 days.

(21) Appl. No.: 15/690,470

(22) Filed: Aug. 30, 2017

(65) Prior Publication Data

US 2018/0055269 A1  Mar. 1, 2018

Related U.S. Application Data

(60) Provisional application No. 62/381,632, filed on Aug. 31, 2016.

(51) Int. Cl.
| | |
|---|---|
| *A47J 27/04* | (2006.01) |
| *A47J 27/12* | (2006.01) |
| *A23L 5/10* | (2016.01) |
| *F24C 15/00* | (2006.01) |
| *F24C 7/08* | (2006.01) |
| *F24C 15/32* | (2006.01) |

(52) U.S. Cl.
CPC .............. *A47J 27/04* (2013.01); *A23L 5/13* (2016.08); *A47J 27/12* (2013.01); *F24C 7/08* (2013.01); *F24C 15/003* (2013.01); *F24C 15/327* (2013.01); *A23V 2002/00* (2013.01); *A47J 2027/043* (2013.01)

(58) Field of Classification Search
CPC .................................. A47J 27/16; F24C 15/32
See application file for complete search history.

(56) References Cited

U.S. PATENT DOCUMENTS

| | | |
|---|---|---|
| 5,890 A | 10/1848 | Stevens |
| 76,231 A | 3/1868 | Morandi |
| 102,608 A | 5/1870 | Smith |
| 171,411 A | 12/1875 | Murray |
| 174,194 A | 2/1876 | Chamberlin |
| 183,554 A | 10/1876 | Flanders |
| 221,542 A | 11/1879 | Farrar |
| 225,584 A | 3/1880 | Flanders |
| 3,000,373 A | 9/1961 | Hawley |
| 3,604,895 A | 9/1971 | MacKay |
| 3,992,984 A | 11/1976 | Treiber |

(Continued)

FOREIGN PATENT DOCUMENTS

| | | |
|---|---|---|
| DE | 2541374 | 3/1977 |
| JP | 2856699 | 2/1999 |

*Primary Examiner* — Avinash A Savani
*Assistant Examiner* — Deepak A Deean
(74) *Attorney, Agent, or Firm* — Thompson Hine LLP (57) ABSTRACT

A steam cooking system includes a first steam cooking cavity, a second steam cooking cavity and a steam generator. The steam generator includes a steam outlet for selectively feeding steam to one or both of the first steam cooking cavity and the second steam cooking cavity, the outlet selectively connectable to feed steam to the first steam cooking cavity and/or the second steam cooking cavity via a valved fluid path. The valved fluid path includes a main supply valve, a first valve and a second valve configured and controllable to assure that the steam generator outlet is always connect to atmosphere by one or more paths.

12 Claims, 5 Drawing Sheets

(56) References Cited

U.S. PATENT DOCUMENTS

| | | |
|---|---|---|
| 4,167,585 A | 9/1979 | Caridis et al. |
| 4,273,991 A | 6/1981 | Barnhill |
| 4,373,430 A | 2/1983 | Allen |
| 4,509,412 A | 4/1985 | Whittenburg et al. |
| 4,510,854 A | 4/1985 | Robertson |
| 4,528,975 A | 7/1985 | Wang |
| 4,582,047 A | 4/1986 | Williams |
| 4,649,898 A | 3/1987 | Martinson |
| 4,995,313 A * | 2/1991 | Delau ............... A47J 27/16 126/197 |
| 5,161,518 A | 11/1992 | Bedford |
| 5,287,798 A | 2/1994 | Takeda |
| 5,368,008 A * | 11/1994 | Oslin ............... A21B 1/26 122/135.3 |
| 5,549,038 A | 8/1996 | Kolvites |
| 5,584,235 A | 12/1996 | DuBois et al. |
| 5,619,983 A | 4/1997 | Smith |
| 5,631,033 A * | 5/1997 | Kolvites ............ A47J 27/16 426/233 |
| 5,653,161 A | 8/1997 | Nopanen et al. |
| 5,662,959 A | 9/1997 | Tippmann |
| 5,865,101 A | 2/1999 | Brown |
| 5,869,812 A | 2/1999 | Creamer et al. |
| 5,968,574 A | 10/1999 | Sann |
| 6,000,392 A * | 12/1999 | Stritzl ............... F22B 7/00 126/20.1 |
| 6,076,452 A | 6/2000 | Dessuise |
| 6,107,605 A | 8/2000 | Creamer et al. |
| 6,143,341 A | 11/2000 | Sikes |
| 6,175,100 B1 | 1/2001 | Creamer et al. |
| 6,237,469 B1 * | 5/2001 | Stritzl ............... A47J 27/04 126/20.1 |
| 6,602,530 B1 | 8/2003 | Weber et al. |
| 2006/0207440 A1 | 9/2006 | Matsuo et al. |
| 2008/0283040 A1* | 11/2008 | Manganiello ........ A21B 3/04 126/369.2 |
| 2009/0071346 A1* | 3/2009 | Saksena ............. A21B 3/04 99/330 |
| 2009/0107477 A1* | 4/2009 | Frock ............... A21B 3/04 126/20.2 |
| 2018/0231330 A1* | 8/2018 | Barmeier ........... F28D 20/0056 |
| 2019/0104879 A1* | 4/2019 | Howitt ............. A47J 27/04 |

\* cited by examiner

STEAM COOKING SYSTEM AND METHOD

CROSS-REFERENCES

This application claims the benefit of U.S. Application Ser. No. 62/381,632, filed Aug. 31, 2016, which is incorporated herein by reference.

TECHNICAL FIELD

This application relates generally to steam cooking ovens and, more specifically, to a steam cooking system in which a single steam generator feeds two steam cooking chambers.

BACKGROUND

In the typical commercial countertop "atmospheric" steamer having a single cooking cavity the bottom of cooking cavity itself includes a water volume from which steam is produced (i.e., steam is produced directly within the cooking cavity). The cooking cavity has an outlet opening such that excess steam can exit the cavity, where it is delivered up a vent stack.

A typical atmospheric steamer having two cooking cavities utilizes a separate steam generator and steam feed lines, each with a respective steam valve, run from the steam generator to the two steam cavities. In some locals, pressurized vessel regulations may apply because the steam generator is not continuously vented to atmosphere.

It would be desirable to provide a steam cooking system with dual cavities that provides suitable venting of the steam generator to atmosphere.

SUMMARY

In one aspect, a steam cooking system includes a first steam cooking cavity, a second steam cooking cavity and a steam generator. The first steam cooking cavity is accessible via a first door, the first steam cooking cavity fluidly connected to atmosphere even when the first door is closed. The second steam cooking cavity is accessible via a second door, the second steam cooking cavity fluidly connected to atmosphere even when the second door is closed. The steam generator heats water to generate steam and includes at least one steam outlet for selectively feeding steam to one or both of the first steam cooking cavity and the second steam cooking cavity. The outlet is selectively connectable to feed steam to the first steam cooking cavity and/or the second steam cooking cavity via a valved path arrangement. The valved path arrangement includes a main supply valve, a first valve and a second valve. The main supply valve includes an input, a default output and a switched output, wherein the input is fluidly connected to the outlet of the steam generator, wherein the main supply valve is configured with a default configuration that connects the outlet of the steam generator to a vent path to atmosphere via the default output. The first valve is downstream of the main supply valve and includes a first input, a first default output and a first switched output, the first input fluidly connected to the switched output of the main supply valve, the first default output fluidly connected to the second steam cooking cavity and the first switched output fluidly connected to the first steam cooking cavity, wherein the first valve is configured with a default configuration that fluidly connects the first input to the second cavity via the first default output. The second valve is downstream of the main supply valve and includes a second input, a second default output and a second switched output, the second input fluidly connected to the switched output of the main supply valve, the second default output fluidly connected to the first steam cooking cavity and the second switched output fluidly connected to the second steam cooking cavity, wherein the second valve is configured with a default configuration that connects the second input to the first cavity via the second default output.

In another aspect, a steam cooking system includes a first steam cooking cavity accessible via a first door, a second steam cooking cavity accessible via a second door and a steam generator for heating water to generate steam. The steam generator includes at least one steam outlet for selectively feeding steam to one or both of the first steam cooking cavity and the second steam cooking cavity, the outlet selectively connectable to feed steam to the first steam cooking cavity and/or the second steam cooking cavity via a valved fluid path. The valved fluid path includes a main supply valve, a first valve and a second valve. The main supply valve is connected to selectively control feed of steam from the steam generator to one or both of (i) the first valve and the second valve or (ii) a vent path to atmosphere, the first valve is connected to selectively control delivery of steam from the main supply valve to one or both of (i) the first steam cooking cavity or (ii) the second steam cooking cavity, and the second valve is connected to selectively control delivery of steam from the main supply valve to one or both of (i) the second steam cooking cavity or (ii) the first steam cooking cavity.

In a further aspect, a method of operating a steam cooking system is provided, where the steam cooking system includes a first steam cooking cavity accessible via a first door, the first steam cooking cavity fluidly connected to atmosphere even when the first door is closed, a second steam cooking cavity accessible via a second door, the second steam cooking cavity fluidly connected to atmosphere even when the second door is closed, and a steam generator for heating water to generate steam, the steam generator including at least one steam outlet for selectively feeding steam to one or both of the first steam cooking cavity and the second steam cooking cavity, the outlet selectively connectable to feed steam to the first steam cooking cavity and/or the second steam cooking cavity via a valved path arrangement. The method involves: the valved path arrangement including a main supply valve fluidly connected to the outlet of the steam generator, a first valve fluidly connected downstream of the main supply valve and a second valve fluidly connected downstream of the main supply valve; controlling the main supply valve so that the main supply valve is always fluidly connected to feed of steam from the steam generator to one or both of (i) the first valve and the second valve or (ii) a vent path to atmosphere; controlling the first valve so that the first valve is always fluidly connected to feed steam from the main supply valve to one or both of (i) the first steam cooking cavity or (ii) the second steam cooking cavity; and controlling the second valve so that the second valve is always fluidly connect to feed steam from the main supply valve to one or both of (i) the second steam cooking cavity or (ii) the first steam cooking cavity.

The details of one or more embodiments are set forth in the accompanying drawings and the description below. Other features, objects, and advantages will be apparent from the description and drawings, and from the claims.

DETAILED DESCRIPTION

Figure 1:
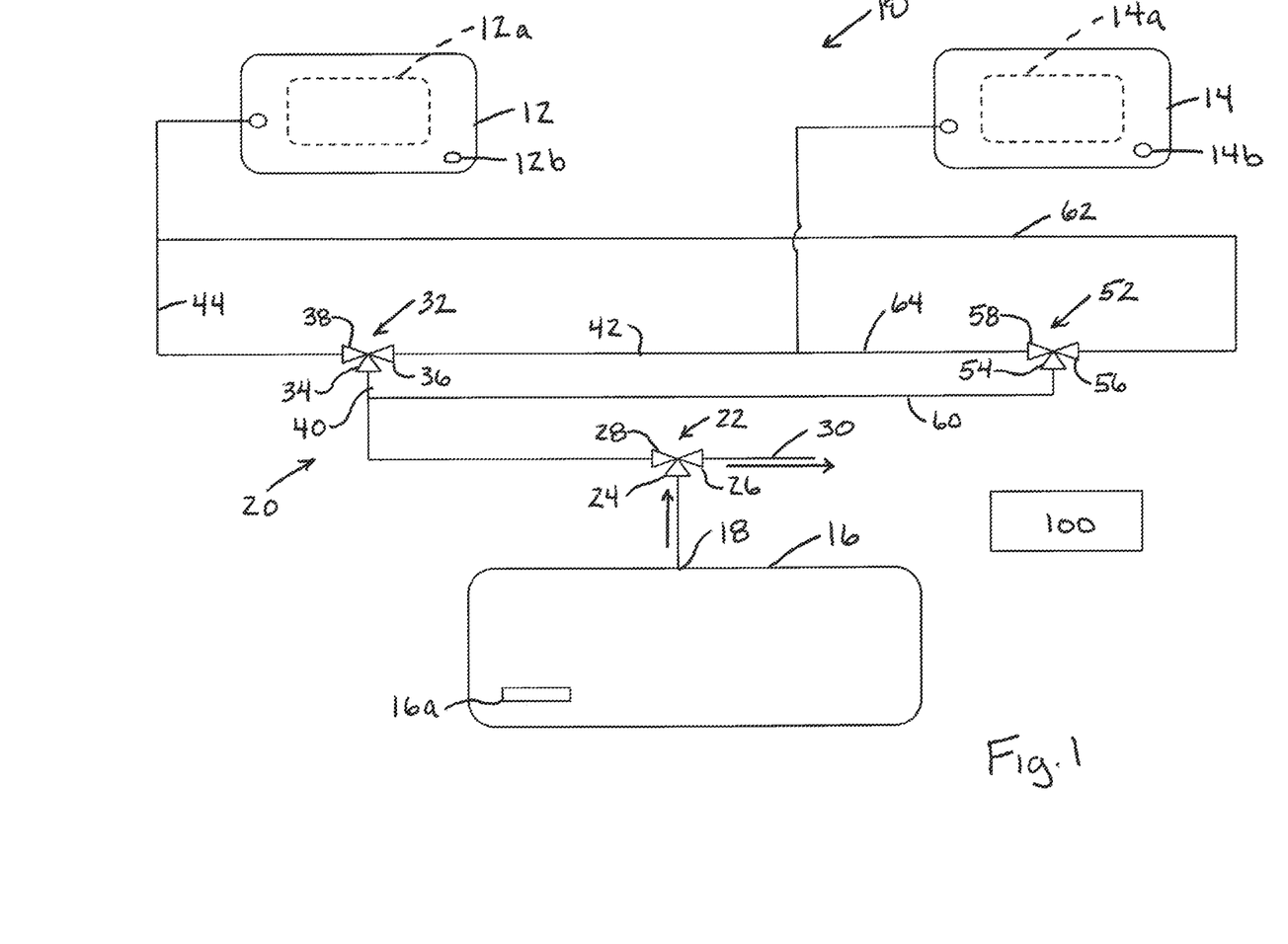
FIG. 1 is a schematic depiction of a steam cooking system in an Off condition.

Referring to FIG. 1, a steam cooking system 10 includes a steam cooking cavity 12 (e.g., an upper cavity of a unit accessible via a door 12a) and a steam cooking cavity 14 (e.g., a lower cavity of a unit accessible via its own door 14a). Each cavity includes a respective drain opening 12,14b that fluidly connects to atmosphere. A steam generator 16 is provided for heating water to generate steam (e.g., utilizing an electric or gaseous fuel heating element 16a). The steam generator includes a steam outlet 18 for feeding steam to both of the steam cooking cavities 12 and 14. The steam outlet is connected to the cavities 12 and 14 via a valved path arrangement 20. The valved path arrangement includes a main supply valve 22 and valves 32 and 52.

The main supply valve 22 has an input 24, a default output 26 and a switched output 28. The main supply valve is configured with a default configuration (e.g., the default position of the valve) that connects the steam generator 16 to a vent path 30 to atmosphere via the default output 26. Thus, the main supply valve 22 is connected to selectively control feed of steam from the steam generator 16 to either (i) the valves 32 and 52 (in the switched position of the valve 22) or (ii) the vent path 30 to atmosphere (in the default position of the valve 22).

Valve 32 is downstream of the main supply valve 22 and has an input 34, a default output 36 and a switched output 38. The input 34 is fluidly connected via a steam line path 40 to the switched output 28 of the main supply valve 22. The default output 36 is fluidly connected via a steam line path 42 to the steam cooking cavity 14, and the switched output 38 is fluidly connected via a steam line path 44 to the steam cooking cavity 12. The valve 32 is configured with a default configuration (e.g., the default position of the valve 32) that connects the input 34 to the cavity 14 via the default output 36. Thus, the valve 32 is connected to selectively control delivery of steam from the main supply valve 22 to either (i) the steam cooking cavity 12 (in the switched position of the valve 32) or (ii) the steam cooking cavity 14 (in the default position of the valve 32).

Valve 52 is downstream of the main supply valve 22 and has an input 54, a default output 56 and a switched output 58. The input 54 is fluidly connected via a steam line path 60 to the switched output 28 of the main supply valve 22. The default output 56 is fluidly connected via a steam line path 62 to the steam cooking cavity 12, and the switched output 58 is fluidly connected via a steam line path 64 to the steam cooking cavity 14. The valve 52 is configured with a default configuration (e.g., the default position of the valve 52) that connects the input 54 to the cavity 12 via the default output 56. Thus, the valve 52 is connected to selectively control delivery of steam from the main supply valve 22 to either (i) the steam cooking cavity 12 (in the default position of the valve 52) or (ii) the steam cooking cavity 14 (in the switched position of the valve 52).

The main supply valve 22, the valve 32 and the valve 52 are configured and plumbed such that, in combination with a valve control arrangement (e.g., schematically depicted by controller 100 in FIG. 1), the main supply valve 22, the valve 32 and the valve 52 are controlled such that the steam generator 16 is always fluidly connected to atmosphere via at least one of the vent path 30 to atmosphere, a path to the steam cooking cavity 12 or a path the steam cooking cavity 14. As used herein, the term controller is intended to broadly encompass any circuit (e.g., solid state, application specific integrated circuit (ASIC), an electronic circuit, a combinational logic circuit, a field programmable gate array (FPGA)), processor(s) (e.g., shared, dedicated, or group— including hardware or software that executes code), software, firmware and/or other components, or a combination of some or all of the above, that carries out the control and/or processing functions of the steam cooking system or the control and/or processing functions of any component thereof.

In one implementation, each valve may be a motorized mixing valve. The steam supply from the generator is always open to atmosphere. This valve-type opens to one output before closing to the other output, and no matter what mode the valves are in, cooking (here switched position) or not (here default position or default configuration), the flow paths through the valves are open to atmosphere via some path. The main supply valve 22 is controlled in part by one or more end switches on each of the valves 32 and 52, which will only actuate after one of the valves 32 and 52 has fully moved to the default position or the switched position. The main supply valve 22 will control the burner (or other heating element) operation between steam and hold modes. Each of the valves 22, 32 and 52 is biased or self-powered for movement to the default position, such that during a power failure the main valve 22 will move to its default position, opening the input 24 to the vent path 30 and drain box, both of which are open to atmosphere. Exemplary sequences of operation as described below.

In an Off state of the system 10 (FIG. 1), all valves 22, 32 and 52 are in their default positions, with the steam generator off (no heating) and connected by valve 22 to the vent path 30, as reflected by the illustrated flow arrows, though no steam would typically be flowing in the absence of heating.

Figure 2:
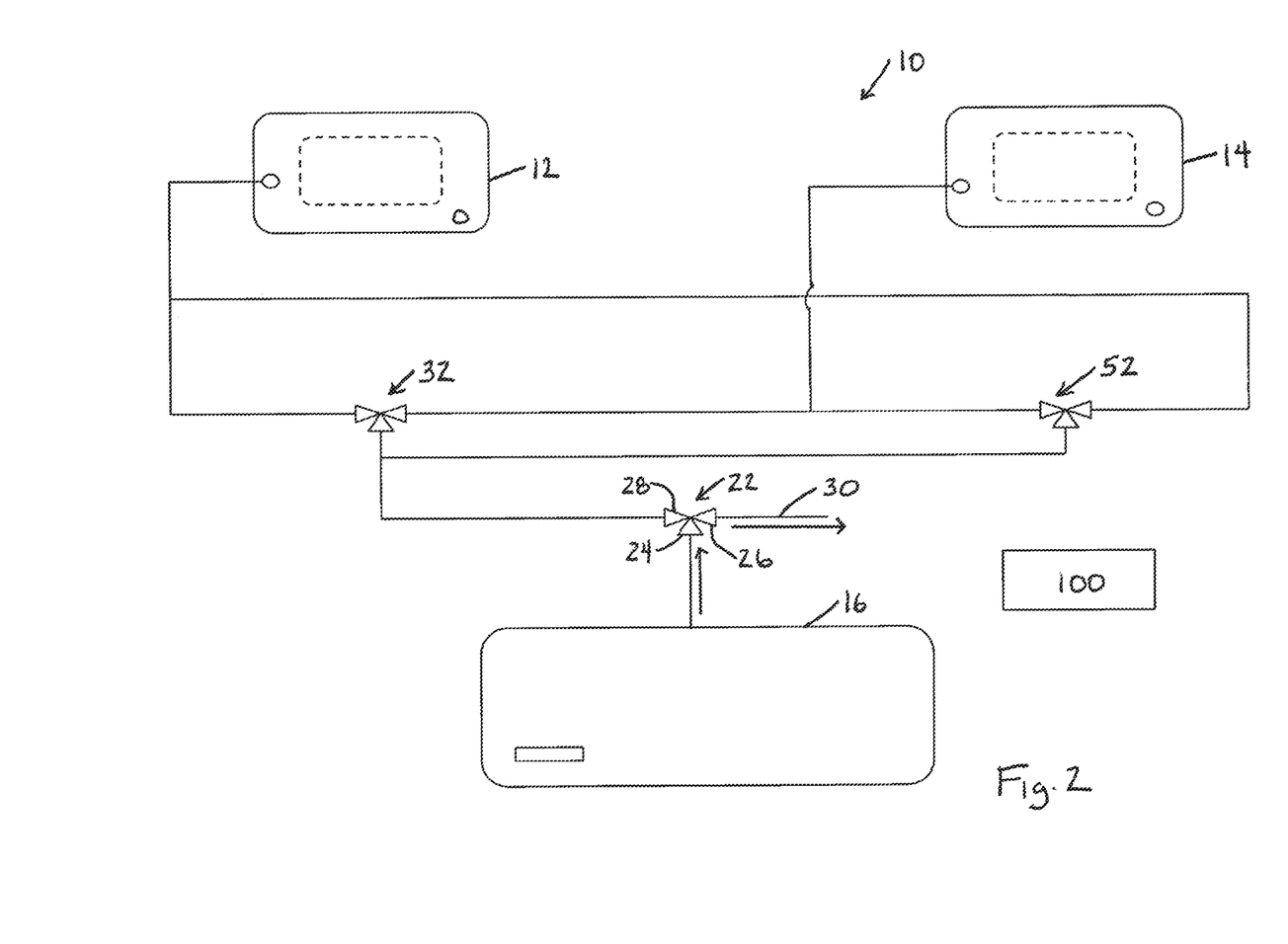
FIG. 2 is a schematic depiction of the steam cooking system in an Preheat or Hold condition.

In a Preheat and/or Hold state of the system 10 (FIG. 2), the valves are all in default positions, with the main valve 22 open to vent path 30 (per the flow arrows), and the steam generator burner will turn on and preheat the water in the steam generator to 185° F. Once the generator temperature has reached 185° F., a ready light is illuminated (e.g., on a user interface of the oven cavity or cavities) indicating the system is ready to cook.

Figure 3:
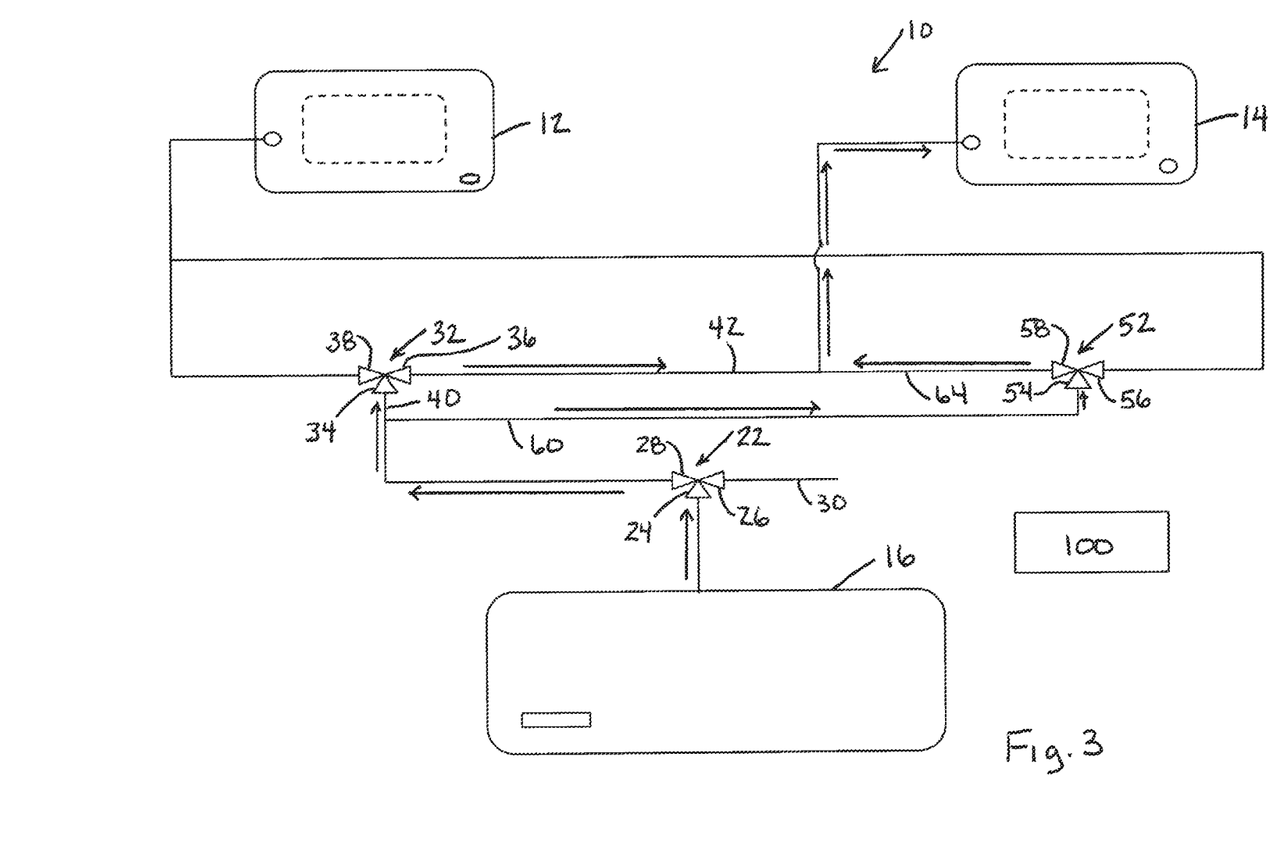
FIG. 3 is a schematic depiction of the steam cooking system when cooking in only the bottom cavity is taking place.

For cooking only with the cooking cavity 14 (FIG. 3), the door to cavity 14 is closed and a timer set. Valve 52 is controlled to move to its switched position. After valve 52 is fully moved to the switched position, the end switch on the valve 52 will actuate the main valve 22 to move to its switched position to supply steam along overlapping paths 40, 60 to the valves 32 and 52 via the switched output 28. The steam generator burner will be activated by the main steam valve 22 end switch when the valve 22 moves fully to its switched position. Steam flow will be through both valves 32 and 52 and to the cavity 14 along paths 42 and 64 (as indicated by the flow arrows). At the end of the cooking operation within the cavity 14, the timer will time out and sound a buzzer. Valve 52 will then be triggered to move back to its default position, changing its flow path from output 58 to output 56, but at all times remaining open to atmosphere via one of the cavities 14 or 12 because the path to output 56 opens before the path to output 58 closes. The end switch on valve 52 will then trigger the main valve 22 to move to its default position, changing its flow path from switched output 28 (to the valves 32, 52) to default output 26 (to the vent path 30 to a drain box), again at all times remaining open to atmosphere by some path because the path to output 26 opens before the path to output 28 closes. When the main valve 22 reaches the default position (or slightly sooner), an end switch on the valve will trigger removal of steam production power from the burner, causing the steam generator burner system to return to a hold mode to maintain temperature at 185° F.

Figure 4:
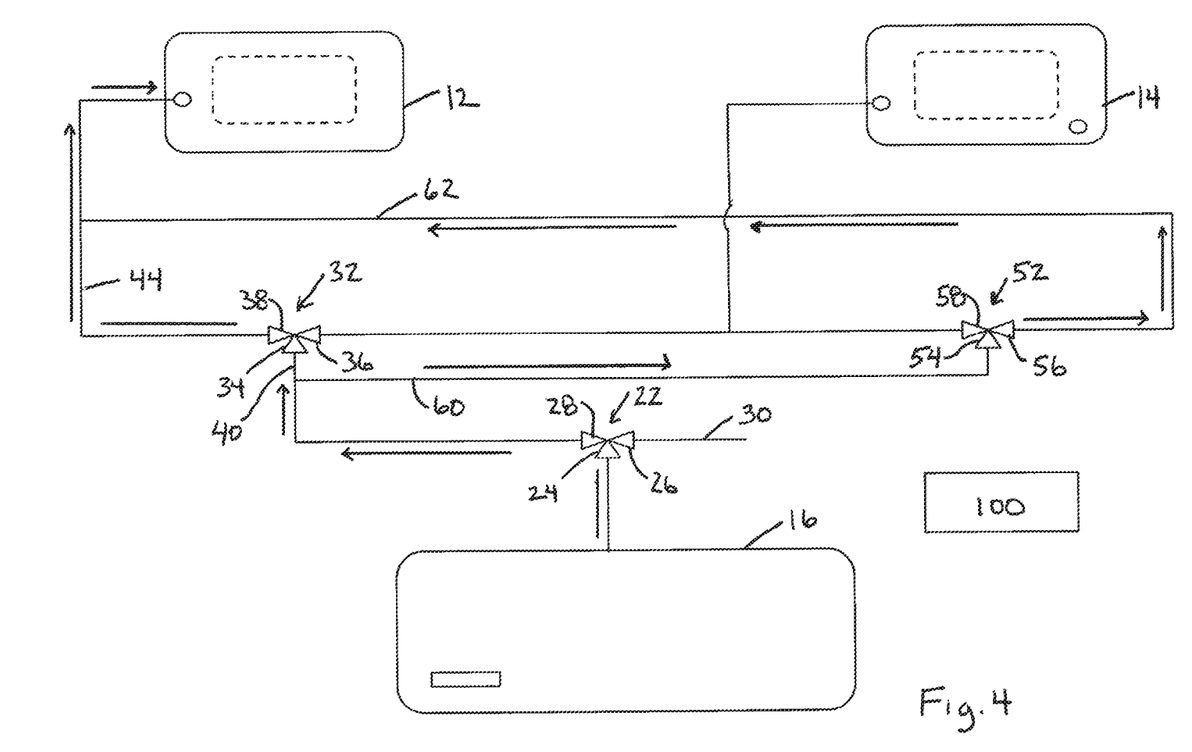
FIG. 4 is a schematic depiction of the steam cooking system when cooking in only the upper cavity is taking place.

For cooking only with the cavity 12 (FIG. 4), the door to cavity 12 is closed and a timer set. Valve 32 is controlled to move to its switched position. After valve 32 is fully moved to the switched position, the end switch on the valve 32 will actuate the main valve 22 to move to its switched position to supply steam along overlapping paths 40, 60 to the valves 32 and 52 via the switched output 28. The steam generator burner will be activated by the main steam valve 22 end switch when the valve 22 moves fully to its switched position. Steam flow will be through both valves 32 and 52 and to the cavity 12 along paths 44 and 62 (as indicated by the flow arrows). At the end of the cooking operation within the cavity 12, the timer will time out and sound a buzzer. Valve 32 will then be triggered to move back to its default position, changing its flow path from output 38 to output 36, but at all times remaining open to atmosphere via one of the cavities 14 or 12 because the path to output 36 opens before the path to output 38 closes. The end switch on valve 32 will then trigger the main valve 22 to move to its default position, changing its flow path from switched output 28 (to the valves 32, 52) to default output 26 (to the vent path 30 to a drain box), again at all times remaining open to atmosphere by some path because the path to output 26 opens before the path to output 28 closes. When the main valve 22 reaches the default position (or slightly sooner), an end switch on the valve 22 will trigger removal of steam production power from the burner, causing the steam generator burner system to return to a hold mode to maintain temperature at 185° F.

Figure 5:
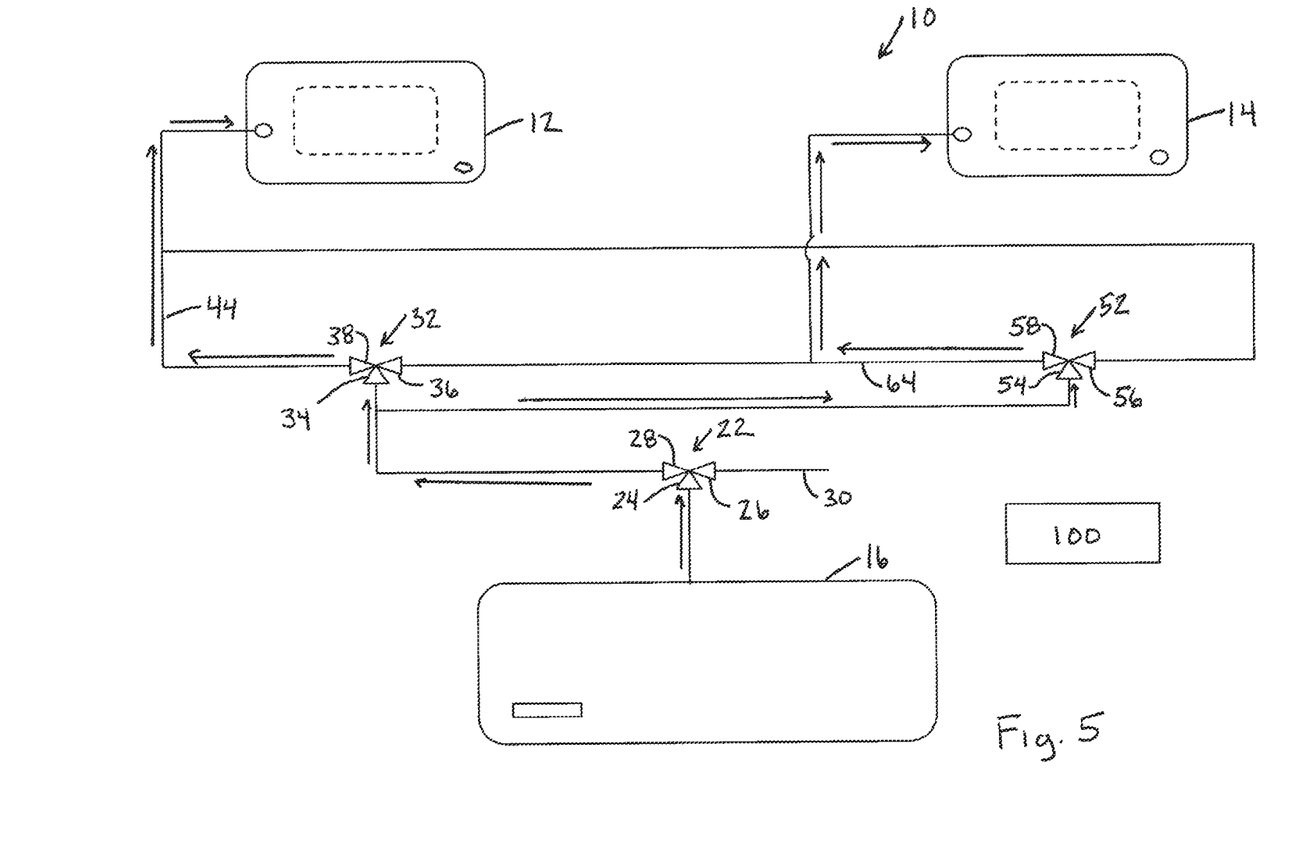
FIG. 5 is a schematic depiction of the steam cooking system when cooking in both cavities is taking place.

For cooking in both cavities 12 and 14 (FIG. 5), the timers are set and the cavity doors closed. By way of example, consider a situation in which the cavity 12 is set to cook for 10 minutes and cavity 14 is set to cook for 5 minutes. Both valves 32 and 52 will move to their respective switched positions to supply steam to the atmospheric cooking cavities via switched outputs 38 and 58. End switches on the valves 32 and 52 will activate the main steam valve 22 to move to its switched position, causing valve 22 to open the path to switched output 28 and close the path to default output 26. An end switch on the main valve 22 is triggered when the valve is fully moved to the switched position, which triggers steam production power to be supplied to the generator burner. Steam flow will be through both valves 32 and 52 to both cavities 12 and 14 along respective paths as indicated by the flow arrows. When the cooking operation for cavity 14 times out at 5 minutes the valve 52 will be triggered to move to its default position, thereby removing steam flow to the cavity 14 and redirecting the flow through valve 52 to cavity 12. When the cooking operation of the cavity 12 times out at 10 minutes, the valve 32 will be triggered to move to its default position, thereby redirecting steam flow through valve 32 from cavity 12 to cavity 14 and simultaneously triggering the end switch on valve 32, which causes the main valve 22 to move back to its default position to connect the steam generator 16 to the vent path 30. When the main valve 22 is fully moved to the default position (or slightly sooner), the end switch on the main valve 22 will trigger, causing removal of steam production power from the burner, causing the steam generator burner system to return to a hold mode to maintain temperature at 185° F.

It is to be clearly understood that the above description is intended by way of illustration and example only, is not intended to be taken by way of limitation, and that other changes and modifications are possible.

What is claimed is:
1. A steam cooking system, comprising:
a first steam cooking cavity accessible via a first door, the first steam cooking cavity fluidly connected to atmosphere even when the first door is closed;
a second steam cooking cavity accessible via a second door, the second steam cooking cavity fluidly connected to atmosphere even when the second door is closed;
a steam generator for heating water to generate steam, the steam generator including at least one steam outlet for selectively feeding steam to one or both of the first steam cooking cavity and the second steam cooking cavity, the outlet selectively connectable to feed steam to the first steam cooking cavity and/or the second steam cooking cavity via a valved path arrangement, wherein the valved path arrangement includes:
a main supply valve having an input, a default output and a switched output, wherein the input is fluidly connected to the outlet of the steam generator, wherein the main supply valve is configured with a default configuration that connects the outlet of the steam generator to a vent path to atmosphere via the default output;
a first valve downstream of the main supply valve, the first valve having a first input, a first default output and a first switched output, the first input fluidly connected to the switched output of the main supply valve, the first default output fluidly connected to the second steam cooking cavity and the first switched output fluidly connected to the first steam cooking cavity, wherein the first valve is configured with a default configuration that fluidly connects the first input to the second cavity via the first default output;
a second valve downstream of the main supply valve, the second valve having a second input, a second default output and a second switched output, the second input fluidly connected to the switched output of the main supply valve, the second default output fluidly connected to the first steam cooking cavity and the second switched output fluidly connected to the second steam cooking cavity, wherein the second valve is configured with a default configuration that connects the second input to the first cavity via the second default output; and
a control arrangement configured to control the main supply valve, the first valve and the second valve such that the steam generator is always fluidly connected to atmosphere via at least one of the vent path to atmosphere, the first steam cooking cavity or the second steam cooking cavity.
2. The steam cooking system of claim 1 wherein:
the first steam cooking cavity includes a drain opening providing fluid connection to atmosphere,
the second steam cooking cavity includes a drain opening providing fluid connection to atmosphere.

3. The steam cooking system of claim 1 wherein each of the main supply valve, the first valve and the second valve comprise valves that open to one output before closing to the other output.

4. The steam cooking system of claim 3 wherein each of the main supply valve, the first valve and the second valve include at least one end switch connected as part of the control arrangement for the main supply valve and the steam generator.

5. The steam cooking system of claim 4 wherein the control arrangement comprises a controller configured to assure that the main supply valve is in its default configuration whenever both the first valve and the second valve are in their respective default configurations.

6. The steam cooking system of claim 4 wherein the control arrangement comprises a controller configured with a first timer function for the first steam cooking cavity and a second timer function for the second steam cooking cavity, the controller configured such that:
  running of the first timer function causes the first valve to move to its switched position;
  running of the second timer function causes the second valve to move to its switched position; and
  an end switch signal from either the first valve or the second valve indicating the first valve is in its switched position or the second valve is in its switched position causes the main supply valve to move to its switched position.

7. The steam cooking system of claim 6 wherein the controller is configured such that:
  completion of the first timer function causes the first valve to move from its switched position to its default configuration;
  completion of the second timer function causes the second valve to move from its switched position to its default configuration;
  the presence of end switch signals from both the first valve and the second valve indicating the first valve and the second valve are both in default configuration causes the main supply valve to move from its switched position to its default configuration.

8. A steam cooking system, comprising:
  a first steam cooking cavity accessible via a first door,
  a second steam cooking cavity accessible via a second door,
  a steam generator for heating water to generate steam, the steam generator including at least one steam outlet for selectively feeding steam to one or both of the first steam cooking cavity and the second steam cooking cavity, the outlet selectively connectable to feed steam to the first steam cooking cavity and/or the second steam cooking cavity via a valved fluid path, wherein the valved fluid path includes:
  a main supply valve, a first valve and a second valve, the main supply valve connected to selectively control feed of steam from the steam generator to one or both of (i) the first valve and the second valve or (ii) a vent path to atmosphere, the first valve connected to selectively control delivery of steam from the main supply valve to one or both of (i) the first steam cooking cavity or (ii) the second steam cooking cavity, and the second valve connected to selectively control delivery of steam from the main supply valve to one or both of (i) the second steam cooking cavity or (ii) the first steam cooking cavity; and
  a valve control arrangement,
  wherein the main supply valve is connected to selectively control feed of steam from the steam generator to either (i) a valve feed path to the first valve and the second valve or (ii) the vent path to atmosphere, the first valve is connected to selectively control delivery of steam from the main supply valve to either (i) a first cavity feed path to the first steam cooking cavity or (ii) a second cavity feed path to the second steam cooking cavity, and the second valve connected to selectively control delivery of steam from the main supply valve to either (i) the second cavity feed path to the second steam cooking cavity or (ii) the first cavity feed path to the first steam cooking cavity;
  wherein the main supply valve, the first valve and the second valve are configured such that, in combination with the valve control arrangement, the main supply valve, the first valve and the second valve are controlled such that the steam generator is always fluidly connected to atmosphere via at least one of the vent path to atmosphere, the first cavity feed path to the first steam cooking cavity or the second cavity feed path to the second steam cooking cavity.

9. The steam cooking system of claim 8 wherein:
  the first steam cooking cavity includes a drain opening providing fluid connection to atmosphere,
  the second steam cooking cavity includes a drain opening providing fluid connection to atmosphere.

10. The steam cooking system of claim 8 wherein the valve control arrangement includes:
  end switches on each of the main supply valve, end switches on the first valve and end switches on the second valve.

11. The steam cooking system of claim 8 wherein the valve control arrangement further includes a first timer function associated with the first steam cooking cavity and a second timer function associated with the second steam cooking cavity.

12. A method of operating a steam cooking system that includes a first steam cooking cavity accessible via a first door, the first steam cooking cavity fluidly connected to atmosphere even when the first door is closed, a second steam cooking cavity accessible via a second door, the second steam cooking cavity fluidly connected to atmosphere even when the second door is closed, and a steam generator for heating water to generate steam, the steam generator including at least one steam outlet for selectively feeding steam to one or both of the first steam cooking cavity and the second steam cooking cavity, the outlet selectively connectable to feed steam to the first steam cooking cavity and/or the second steam cooking cavity via a valved path arrangement, the method comprising:
  the valved path arrangement including a main supply valve fluidly connected to the outlet of the steam generator, a first valve fluidly connected downstream of the main supply valve and a second valve fluidly connected downstream of the main supply valve;
  controlling the main supply valve so that the main supply valve is always fluidly connected to feed of steam from the steam generator to one or both of (i) the first valve and the second valve or (ii) a vent path to atmosphere,
  controlling the first valve so that the first valve is always fluidly connected to feed steam from the main supply valve to one or both of (i) the first steam cooking cavity or (ii) the second steam cooking cavity, and
  controlling the second valve so that the second valve is always fluidly connect to feed steam from the main supply valve to one or both of (i) the second steam cooking cavity or (ii) the first steam cooking cavity, such that the steam generator is always fluidly connected to atmosphere via at least one of the vent path to atmosphere, the first steam cooking cavity or the second steam cooking cavity.

\* \* \* \* \*